United States Patent [19]

Finley et al.

[11] 4,345,805

[45] Aug. 24, 1982

[54] SELF-SEALING VACUUM HOSE SWIVEL FITTING

[75] Inventors: Richard O. Finley, Redondo Beach; David A. Stanwood, West Covina, both of Calif.

[73] Assignee: Plastiflex Company International, Fountain Valley, Calif.

[21] Appl. No.: 76,285

[22] Filed: Sep. 17, 1979

[51] Int. Cl.³ .................. H01R 3/04; F16L 33/00
[52] U.S. Cl. ...................... 339/16 R; 285/7;
 285/110; 285/280; 285/DIG. 4; 285/DIG. 22
[58] Field of Search .............. 285/7, 238, 239, 240,
 285/110, DIG. 4, DIG. 22, 280, 278, 275, 272;
 339/16 R, 15

[56] References Cited

U.S. PATENT DOCUMENTS

| | | |
|---|---|---|
| 738,503 | 9/1903 | Waters .................. 285/374 X |
| 789,541 | 5/1905 | Hayes .................... 285/85 |
| 922,805 | 5/1909 | Nelson et al. ............ 285/110 X |
| 2,103,838 | 12/1937 | Bach ..................... 285/238 |
| 2,407,745 | 9/1946 | Jacobson . |
| 2,427,456 | 9/1947 | Hoy . |
| 2,446,327 | 8/1948 | Heinrich . |
| 2,900,999 | 8/1959 | Courtot .................. 285/110 X |
| 3,008,738 | 11/1961 | Longfellow .............. 285/354 X |
| 3,167,330 | 1/1965 | Draudt ................... 285/7 |
| 3,262,718 | 7/1966 | Draudt ................... 285/7 |
| 3,696,332 | 10/1972 | Dickson, Jr. et al. . |
| 3,727,949 | 4/1973 | Kleykamp et al. ......... 285/280 X |
| 3,866,995 | 2/1975 | Campo . |
| 3,934,902 | 1/1976 | McNamee ................. 285/156 |
| 4,018,493 | 4/1977 | Lyman et al. ............. 285/7 |
| 4,099,744 | 7/1978 | Kutnyak et al. .......... 285/280 X |
| 4,174,858 | 11/1979 | Brooks ................... 285/7 |

FOREIGN PATENT DOCUMENTS

| | | |
|---|---|---|
| 275657 | 7/1966 | Australia . |
| 520755 | 3/1931 | Fed. Rep. of Germany ...... 285/110 |
| 2142068 | 3/1973 | Fed. Rep. of Germany . |
| 2332846 | 1/1975 | Fed. Rep. of Germany . |
| 2906317 | 8/1979 | Fed. Rep. of Germany . |
| 1286787 | 1/1962 | France ................... 285/238 |
| 1451099 | 7/1966 | France ................... 285/110 |
| 1531470 | 5/1968 | France . |
| 1580195 | 7/1969 | France . |
| 2376651 | 8/1978 | France . |

Primary Examiner—Thomas F. Callaghan
Attorney, Agent, or Firm—Lewis B. Sternfels

[57] ABSTRACT

A fitting (10) secures a vacuum hose (20) to a wand or tank of a vacuum cleaner. The hose is swivelably and pneumatically sealed within the fitting through use of a sealing surface (18) on the fitting in engagement with a flexible lip (28) at the end portion (24) of the vacuum hose. A ring (30) engageable with the fitting compresses the end portion in order to bias the flexible lip into engagement with the sealing surface. The electrical terminations including slip rings (144) are used to terminate a hose (120) with electrical conductors therein to cooperating electrical connections.

9 Claims, 9 Drawing Figures

SELF-SEALING VACUUM HOSE SWIVEL FITTING

The present invention relates to a fitting for attaching a vacuum hose to a wand or tank end adapter of a vacuum cleaner.

BACKGROUND ART

Swivel fittings between vacuum cleaner hoses and wands or tank end adapters of vacuum cleaners are well-represented by a plurality of designs in the art. Examples of such attachments include those disclosed in U.S. Pat. Nos. 2,427,456, 2,621,048, and 3,928,715, as perhaps being most related to the disclosure of the present invention. The last identified patent discloses a pair of hose connectors fixed to the opposite ends of a vacuum hose and made integral therewith so that electrical conductors in the hose may be conveniently terminated in the hose connectors. The swivel connection is effected between the hose connector and the end of a wand or canister or tank. A separate spring and corrugated seal is shown in U.S. Pat. No. 2,621,048, while a corrugated element in U.S. Pat. No. 2,427,456 acts both as a seal and the spring element. While presumably effective to satisfy the needs for which they were designed, the fittings disclosed in these patents do not meet those criteria which are felt to meet the need for a more effective hose fitting.

Specifically, it is desired that the fitting, which will attach a vacuum hose to a wand or tank end adapter, will allow the adapter to swivel freely and seal against air or fluid loss and to increase the seal upon increase in vacuum. It is further desired that the fitting design reduce the need for critical dimensional stability while, at the same time, reduce mold and inspection costs.

SUMMARY OF THE INVENTION

The present invention overcomes the disadvantages of the prior art and meets the above criteria by utilizing the natural spring characteristics inherent in the undulated wall of a hose to apply sealing pressure to the hose end and against a sealing surface on the fitting. In this design, the hose is swivelable with respect to the fitting. Such a design further enables a simple electrical interconnection between the hose and the fitting.

It is, therefore, an object of the invention to provide for a swivelable, self-sealing vacuum hose fitting of simple design.

Another object is to provide for such a fitting which does not require critical dimensional stability.

Another object is to provide for such a fitting in which mold and inspection costs, as well as other manufacturing costs, are reduced.

Another object is to provide for such a fitting whose design permits it to work with any hose that has a quality of a natural spring, such as in a blow-molded bellows hose or in a spirally wound hose.

Another object is to provide for such a fitting which can easily incorporate electrical terminations of conductors carried by a hose.

Other aims and objects as well as a more complete understanding of the present invention will appear from the following explanation of exemplary embodiments and the accompanying drawings thereof.

DETAILED DESCRIPTION OF THE INVENTION

Figure 1:
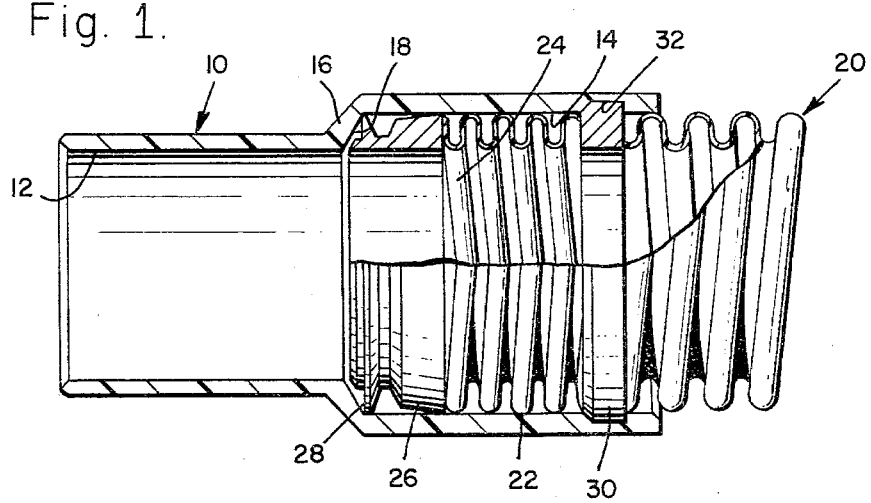
FIG. 1 is a cross-section of the preferred embodiment of the present invention depicting the attachment between a spirally wound vacuum hose and a suitable sealing end fixture and a wand or tank end adapter of a vacuum cleaner.

Accordingly, with reference to FIG. 1, a fitting 10 may comprise a cuff or a member which is a part of or attached to the wand or the end of a canister or tank of a vacuum cleaner. The fitting preferably comprises two sections respectively having internal surfaces 12 and 14 of different diameters, which are connected by a transition 16. Transition 16 presents a surface 18 which is angled, as desired, away from the axis of fitting 10 sufficient for sealing purposes, as will be further described.

Received within larger diameter 14 of fitting 10 is a vacuum hose 20 which, for purposes of the present invention, must be formed with an undulated wall 22, at least as its end portion 24. Accordingly, hose 24 may be configured as a bellows, which may be formed by blow-molding operations, or with a spirally wound profile, such as depicted in U.S. Pat. No. 3,255,780 and U.S. patent applications, Ser. Nos. 678,547 (filed Apr. 20, 1976); 4,695 (filed Jan. 19, 1979); and 19,454 (filed on Mar. 12, 1979). End portion 24 is terminated by a ring member 26 having a flexible annular lip 28 which seals upon contact with sealing surface 18. Upon increase of vacuum within hose 20 and fitting 10, the sealing action of lip 28 will be enhanced against sealing surface 18. If desired, the flexible lip may be made a part of the hose itself, as depicted in FIGS. 2 through 5, especially when the hose undulations comprise a series of spaced annuli or bellows, formed such as by a blow-molding manufacturing operation.

In order to insure that lip 28 is always in contact with the sealing surface 18 under all conditions, including those when no vacuum exists, a bias is exerted against the flexible lip. To obtain such a bias, the natural spring characteristics of the undulated hose are used to advantage. Specifically, a ring 30 is coupled between the larger diameter portion 14 and hose end portion 24, and spaced from sealing surface 18 and flexible lip 28. Specifically, ring 30 is bonded or otherwise attached to hose 20 in any convenient manner and is adapted to snap within an annular retaining recess 32 formed within larger diameter portion 14 of fitting 10. The distance between annular recess 32 and sealing surface 18 is less than the distance between ring 30 and flexible lip 28, when undulated wall 22 at end portion 24 is relaxed in its unbiased portion. Therefore, end portion 24 is slightly compressed when ring 30 is engaged within annular recess 32 so that end portion 24 will act as a spring to bias the flexible lip into engagement with the sealing surface.

Figure 2:
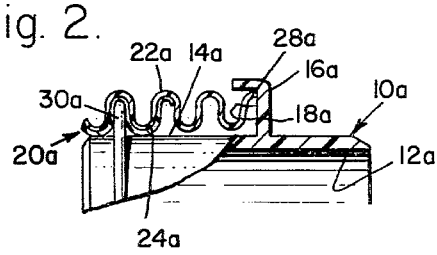
FIGS. 2 through 5 illustrate a vacuum hose with annular ribs as designs of the fitting shown in FIG. 1.
Figure 3:
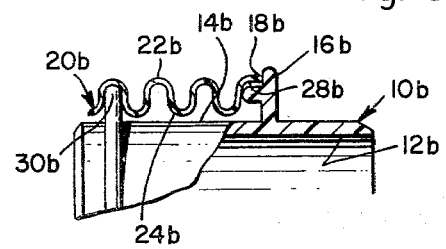

As shown in FIGS. 2 through 5, other arrangements of the concept shown in FIG. 1 are shown. FIGS. 2 and 3 depict fittings 10a and 10b internally of and supporting hoses 20a and 20b. In these embodiments, annular protuberances 30a and 30b extend from the outer surface of fittings 10a and 10b to engage one of the undulated portions of the hose. Other members 16a and 16b extend from the fittings to present sealing surfaces 18a and 18b against which flexible lips 28a and 28b are urged when end portions 24a and 24b are compressed through the interaction of proturberances 30a and 30b with the hose.

Figure 4:
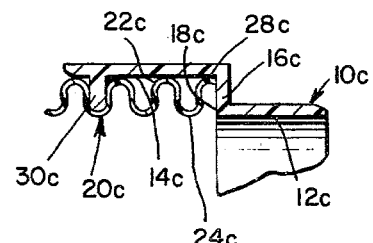
Figure 5:
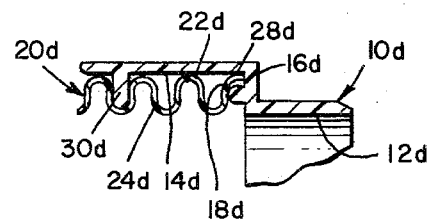
Figure 6:
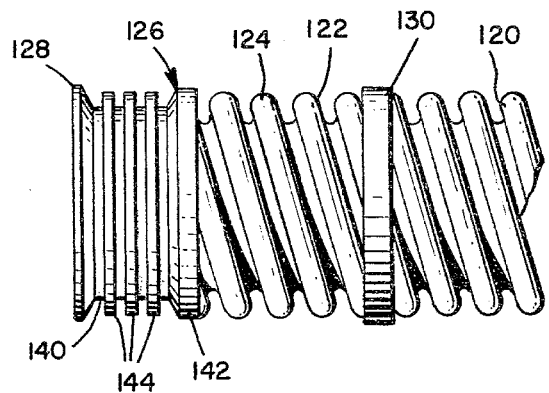
FIG. 6 illustrates a hose fitting additionally incorporating a means by which electrical conductors carried by the hose may be terminated and connected to the fitting.
Figure 7:
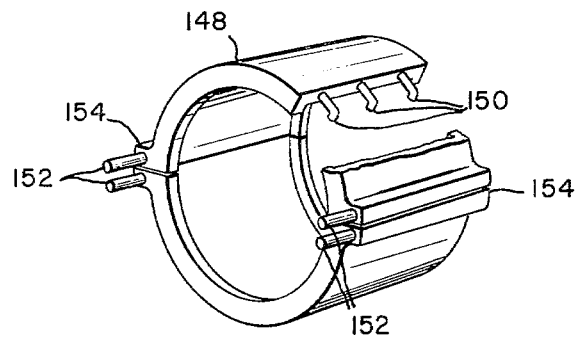
FIGS. 7, 8 and 9 depict modifications to the fitting for use with the electrical conductor embodiment of FIG. 6.

In FIGS. 4 and 5, similar arrangements are shown but with hoses 20c and 20d within the interior of fittings 10c and 10d so that interaction between these hoses and inward projections 30c and 30d compress hose portions 24c and 24d so that their flexible lips 28c and 28d will be in sealing engagement respectively with sealing surfaces 28c and 28d.

The embodiment shown in FIGS. 6 through 9 includes a means by which conductor wires within a hose 120 may be terminated within a fitting 10. Specifically, a ring member 126, which is similar to that depicted in FIG. 1, additionally includes a flat cylindrical surface 140 disposed between its flexible lip 128 and a connecting portion 142, which is used to affix and seal ring member 126 to hose 120 at its end portion 124. Placed on and secured to cylindrical surface 140 in any convenient manner are a plurality of conductor rings 144 equal in number to the conductors within hose 120 and each electrically coupled to the conductors within the hose.

Figure 8:
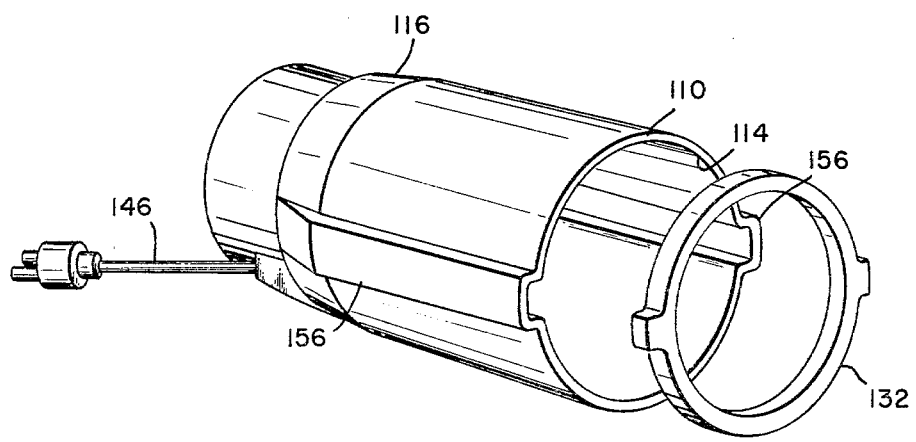
Figure 9:
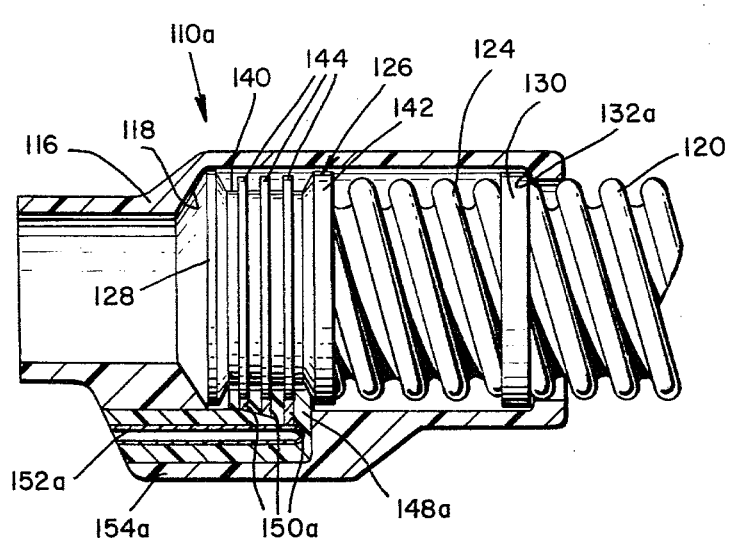

Slip rings 144 terminating the conductors within hose 120 are electrically coupled to fitting 110 of FIG. 8 or fitting 110a of FIG. 9 and its electrical cord 146 by means of any suitable structure, such a contact mount 148 (FIG. 7) or 148a (FIG. 9). Specifically, contact mounts 148 and 148a respectively include a plurality of electrical contacts 150 and 150a which are equal in number to rings 144 and are adapted to be biased into electrical contact therewith. Electrical contacts 150 and 150a are coupled to cord 146 respectively by wires 152 (FIG. 7) and contacts 152a (FIG. 9) which are molded in place within radially extending keys 154 (FIG. 7) and fitting enlargement 154a. Keys 154 are disposed to slip within slots 156 of fitting 110. Accordingly, the same sealing and increased sealing contact between flexible lip 128 and the sealing surface (118 in FIG. 9) on transition 116 occur as described above with respect to FIG. 1, with end portion 124 being compressed by the action of ring 130 in fitting 110. A retaining ring 132 (FIG. 8) and turned in portion 132a of fitting 110a (FIG. 9) are respectively placed in back of ring 130 and is secured to or form a part of fitting to press against ring 130 in the same manner as groove 32 of FIG. 1 retains ring 30 thereof.

Although the invention has been described with reference to particular embodiments thereof, it should be realized that various changes and modifications may be made therein without departing from the spirit and scope of the invention.

What is claimed is:

1. In a vacuum hose formed with an undulated wall, and a fitting securing said hose at least at one of its end portions to one of a wand or tank of a vacuum cleaner, the improvement in swivelably and pneumatically sealing said hose end portion to said fitting comprising:
   a sealing surface on the interior of said fitting and swivelably and sealingly engaged under a spring bias with means terminating said hose end portion;
   a generally annular flexible lip on said hose terminating means whose sealing engagement with said sealing surface is enhanced by vacuum created in said hose; and
   means defining a groove in one of said fitting and said hose end portion and an annular member on the other of said fitting and said hose end portion and rotatably extending within said groove means to form a swivelable coupling therebetween, said swivelable coupling being spaced from said sealing surface and said hose terminating means and cooperating with said sealing surface to resiliently compress a portion of said undulated wall adjacent to said hose terminating means and thereby to form said spring bias and to urge said annular flexible lip into a maintained, positive, pneumatically sealing and swivelable contact with said sealing surface.

2. The improvement according to claim 1 in which said sealing surface is formed on an annular member extending from said fitting.

3. The improvement according to claim 2 wherein said annular member extends from the interior surface of said fitting, with said hose end portion being supported within said interior surface.

4. The improvement according to claims 1 or 3 in which said annular member of said swivelable coupling comprises a protuberance and said groove means comprises a portion of said undulated wall, said protuberance extending from said fitting into engagement with said undulated wall.

5. In a vacuum hose formed with an undulated wall, and a fitting securing said hose at least at one of its end portions to one of a wand or tank of a vacuum cleaner, the improvement in swivelably and pneumatically sealing said hose end portion to said fitting comprising:
   a sealing surface on said fitting swivelably and sealingly engaged with means terminating said hose end portion; and
   a swivelable coupling including a ring secured to said hose, and an annular recess in the interior surface of said fitting for rotatable engagement between said ring and said recess, said swivelable coupling being spaced from said sealing surface and said hose terminating means and cooperating with said sealing surface to resiliently compress a portion of said undulated wall adjacent to said hose terminating means and thereby to urge said hose terminating means into positive, pneumatically sealing and swivelable contact with said sealing surface.

6. The improvement according to claim 5 in which said hose terminating means includes a generally annular flexible lip whose sealing engagement with said sealing surface is enhanced by vacuum created in said hose.

7. The improvement according to claim 6 in which said hose terminating means further includes a ring member sealingly affixed to said hose end portion, with said flexible lip extending from said ring member.

8. The improvement according to claim 7 in which said fitting includes a pair of internal surfaces having different diameters connected by a transition, with the larger diameter surface including the annular recess, and said sealing surface being formed by the transition between said pair of internal surfaces.

9. The improvement according to claims 7 or 8 in which said hose supports electrical conductors, said ring member includes an external surface adjacent said flexible lip, and a plurality of electrically conductive slip rings secured to and on said external surface of said ring member, and said fitting includes a plurality of electrically conductive contacts extending into respective contact with said slip ring.

* * * * *